(12) United States Patent
Taiga

(10) Patent No.: US 9,162,722 B1
(45) Date of Patent: Oct. 20, 2015

(54) VIBRATION ALARM DEVICE FOR A BICYCLE

(71) Applicant: Crops Co., Ltd., Tokyo (JP)

(72) Inventor: Keiji Taiga, Tokyo (JP)

(73) Assignee: Crops Co., Ltd., Tokyo (JP)

( * ) Notice: Subject to any disclaimer, the term of this patent is extended or adjusted under 35 U.S.C. 154(b) by 0 days.

(21) Appl. No.: 14/283,271

(22) Filed: May 21, 2014

(51) Int. Cl.
G08B 21/00 (2006.01)
B62H 5/20 (2006.01)
B62H 5/14 (2006.01)
B62J 11/00 (2006.01)

(52) U.S. Cl.
CPC .. B62H 5/20 (2013.01); B62H 5/14 (2013.01); B62J 11/00 (2013.01)

(58) Field of Classification Search
CPC .......................................................... B62H 5/20
USPC ....................... 340/432, 427, 429; 70/39, 233
See application file for complete search history.

(56) References Cited

U.S. PATENT DOCUMENTS 5,408,212 A * 4/1995 Meyers et al. ................ 340/427

* cited by examiner

Primary Examiner — Jeffrey Hofsass
(74) Attorney, Agent, or Firm — Alan D. Kamrath; Kamrath IP Lawfirm, P.A.

(57) ABSTRACT

An alarm device for a bicycle includes a locking block and an alarm assembly connected with the locking block. The alarm assembly includes a base, a mounting seat, an alarm unit, a top cover, and a bottom cover. The alarm unit includes a circuit board, at least one sensor, at least one buzzer, a control switch button, at least one storage battery, an indication lamp, and at least one socket hole. When the alarm unit is started, the alarm unit detects vibration or shaking of the locking block or the alarm assembly due to an external force and transmits an alarm signal so as to achieve a burglar-proof effect.

8 Claims, 8 Drawing Sheets

VIBRATION ALARM DEVICE FOR A BICYCLE

BACKGROUND OF THE INVENTION

1. Field of the Invention

The present invention relates to an alarm device and, more particularly, to an alarm device for a bicycle.

2. Description of the Related Art

A first conventional lock includes a cable extended through the tire and the spokes of a bicycle so as to lock the bicycle. However, the burglar can directly carry away the whole bicycle so that the first conventional lock fails to achieve a burglarproof purpose efficiently. A second conventional lock comprises an elastic and flexible metallic chain whose one end is extended through the frame of the bicycle and an object, such as an electric pole, a fence, a bar and the like, and is locked onto the other end of the metallic chain. Thus, the bicycle is limited to the object to achieve a burglarproof purpose. However, the second conventional lock cannot transmit an audible alarm signal to the rider when a thief is breaking the metallic chain, thereby decreasing the anti-theft effect.

BRIEF SUMMARY OF THE INVENTION

In accordance with the present invention, there is provided an alarm device for a bicycle, comprising a locking block having an interior provided with a receiving chamber and having a first end provided with two slots, two baffles mounted in the receiving chamber of the locking block and each provided with a mounting recess, two channels each defined between the locking block and one of the two baffles and each connected to one of the two slots of the locking block, two balls each movably mounted in the mounting recess of one of the two baffles, two locking blades mounted on a second end of the locking block, a slide movably mounted in the receiving chamber of the locking block and having a bottom provided with a receiving recess, an elastic member mounted in the receiving recess of the slide and pressing the slide, and an alarm assembly connected with the locking block. The alarm assembly includes a base mounted on a top of the locking block, a mounting seat mounted on the base, an alarm unit mounted on the mounting seat, a top cover mounted on the alarm unit, and a bottom cover mounted on a bottom of the locking block and juxtaposed to the top cover. The base of the alarm assembly has a top provided with a receiving depression which has a surface provided with a hollow portion. The mounting seat of the alarm assembly is mounted in the receiving depression of the base. When the alarm unit of the alarm assembly is started, the alarm unit of the alarm assembly detects vibration or shaking of the locking block or the alarm assembly due to an external force and transmits an alarm signal.

The alarm unit of the alarm assembly includes a circuit board, at least one sensor mounted on and electrically connected with the circuit board, at least one buzzer electrically coupled to the sensor, a control switch button mounted on the circuit board and corresponding to the exposing hole of the mounting seat, at least one storage battery electrically connected with the circuit board, an indication lamp mounted on the circuit board and corresponding to the exposing hole of the mounting seat, and at least one socket hole mounted on the circuit board and corresponding to the exposing hole of the mounting seat.

According to the primary advantage of the present invention, the alarm device is combined with a lock to lock the bicycle and to achieve a burglar-proof alarm effect.

According to another advantage of the present invention, the alarm device further comprises a mounting structure which is mounted on the frame of the bicycle to achieve a burglar-proof alarm effect.

According to a further advantage of the present invention, when the sensor detects the locking block or the alarm assembly is vibrated or shook due to an external force, the sensor transmits a command to the buzzer which transmits an audible alarm signal so as to achieve a burglar-proof effect.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
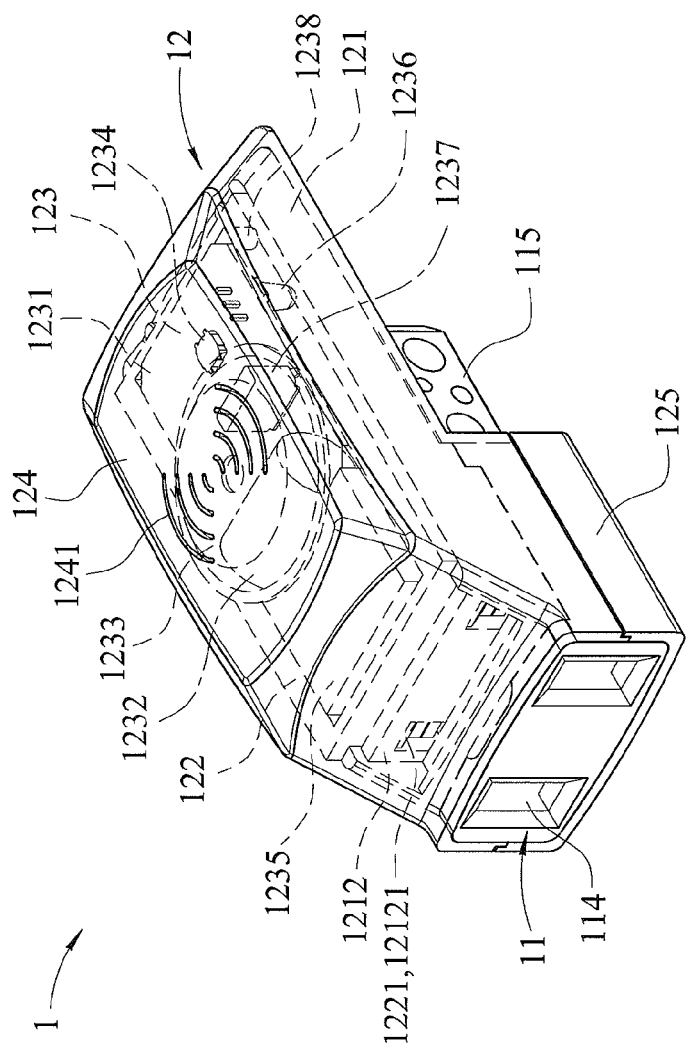
FIG. 1 is a perspective view of an alarm device for a bicycle in accordance with the preferred embodiment of the present invention.

Referring to the drawings and initially to FIGS. 1-5, an alarm device 1 for a bicycle 3 in accordance with the preferred embodiment of the present invention comprises a locking block 11 having an interior provided with a receiving chamber 111 and having a first end provided with two slots 114, two baffles 112 mounted in the receiving chamber 111 of the locking block 11 and each provided with a mounting recess 1121, two channels 113 each defined between the locking block 11 and one of the two baffles 112 and each connected to one of the two slots 114 of the locking block 11, two balls 116 each movably mounted in the mounting recess 1121 of one of the two baffles 112, two locking blades 115 mounted on a second end of the locking block 11 and parallel with each other, a slide 117 movably mounted in the receiving chamber 111 of the locking block 11 and having a bottom provided with a receiving recess 1172, an elastic member 118 mounted in the receiving recess 1172 of the slide 117 and pressing the slide 117 to move the slide 117, and an alarm assembly 12 connected with the locking block 11.

The locking block 11 is provided with a plurality of mounting holes 119. The slide 117 has two opposite sides each provided with an arcuate limit groove 1171 abutting one of the two balls 116. Each of the locking blades 115 is provided with at least one locking hole 1151. In the preferred embodiment of the present invention, the elastic member 118 is a spring or an elastic plate. The alarm assembly 12 includes a base 121 mounted on a top of the locking block 11, a mounting seat 122 mounted on the base 121, an alarm unit 123 mounted on the mounting seat 122, a top cover 124 mounted on the alarm unit 123, and a bottom cover 125 mounted on a bottom of the locking block 11 and juxtaposed to the top cover 124.

The base 121 of the alarm assembly 12 has a top provided with a receiving depression 1211 which has a surface provided with a hollow portion 1213. The base 121 of the alarm assembly 12 has a first end provided with a positioning plate 1212 and a second end provided with at least one through hole 1214. The positioning plate 1212 of the base 121 is provided with at least one positioning hole 12121. The hollow portion 1213 of the base 121 is located between the positioning plate 1212 and the through hole 1214. The base 121 of the alarm assembly 12 has a bottom provided with a plurality of fixing pins 1216 inserted into the mounting holes 119 of the locking block 11.

The mounting seat 122 of the alarm assembly 12 is mounted in the receiving depression 1211 of the base 121. The mounting seat 122 of the alarm assembly 12 has a contour matching that of the receiving depression 1211 of the base 121 so that the mounting seat 122 of the alarm assembly 12 is secured in the receiving depression 1211 of the base 121. The mounting seat 122 of the alarm assembly 12 has an end face provided with at least one positioning knobs 1221 inserted into and positioned in the positioning hole 12121 of the positioning plate 1212. The mounting seat 122 of the alarm assembly 12 is provided with a mounting chamber 1222 for mounting the alarm unit 123. The mounting chamber 1222 of the mounting seat 122 is provided with an exposing hole 1223.

The alarm unit 123 of the alarm assembly 12 is mounted in the mounting chamber 1222 of the mounting seat 122. When the alarm unit 123 of the alarm assembly 12 is started, the alarm unit 123 of the alarm assembly 12 detects vibration or shaking of the locking block 11 or the alarm assembly 12 due to an external force and transmits an alarm signal.

The alarm unit 123 of the alarm assembly 12 includes a circuit board 1231, at least one sensor 1232 mounted on and electrically connected with the circuit board 1231, at least one buzzer 1233 electrically coupled to the sensor 1232, a control switch button 1234 mounted on the circuit board 1231 and corresponding to the exposing hole 1223 of the mounting seat 122, at least one storage battery 1235 electrically connected with the circuit board 1231, an indication lamp 1236 mounted on the circuit board 1231 and corresponding to the exposing hole 1223 of the mounting seat 122, at least one socket hole 1237 mounted on the circuit board 1231 and corresponding to the exposing hole 1223 of the mounting seat 122, and a volume control button 1238 mounted on the circuit board 1231.

The sensor 1232 of the alarm unit 123 senses the status of the locking block 11 or the alarm assembly 12 to detect if the locking block 11 or the alarm assembly 12 is vibrated or shook due to an external force. The buzzer 1233 of the alarm unit 123 receives a command transmitted from the sensor 1232 and transmits an audible alarm signal. The control switch button 1234 of the alarm unit 123 turns on or off the alarm unit 123. The storage battery 1235 of the alarm unit 123 supplies an electric power required by the alarm unit 123. The indication lamp 1236 of the alarm unit 123 indicates the quantity of electricity of the storage battery 1235. Preferably, the indication lamp 1236 of the alarm unit 123 indicates the quantity of electricity of the storage battery 1235 by different colors. The volume control button 1238 of the alarm unit 123 controls and regulates the volume of the audible alarm signal transmitted from the buzzer 1233.

In the preferred embodiment of the present invention, the alarm assembly 12 further includes a plurality of waterproof plugs 1224 inserted into the exposing hole 1223 of the mounting seat 122 to prevent dust or moisture from being infiltrated into the mounting chamber 1222 of the mounting seat 122, and to prevent the alarm unit 123 from being worn out.

The top cover 124 of the alarm assembly 12 covers the alarm unit 123, the mounting seat 122, the base 121 and the top of the locking block 11. The top cover 124 of the alarm assembly 12 has a surface provided with a plurality of buzzing holes 1241. The top cover 124 of the alarm assembly 12 has a bottom provided with at least one screw bore 1242 aligning with the through hole 1214 of the base 121, and the alarm assembly 12 further includes at least one threaded fastening member 1215 extended through the through hole 1214 of the base 121 and screwed into the screw bore 1242 of the top cover 124. The bottom cover 125 of the alarm assembly 12 is provided with a plurality of fixing holes 1251 mounted in the mounting holes 119 of the locking block 11 and combined with the fixing pins 1216 of the base 121.

Figure 2:
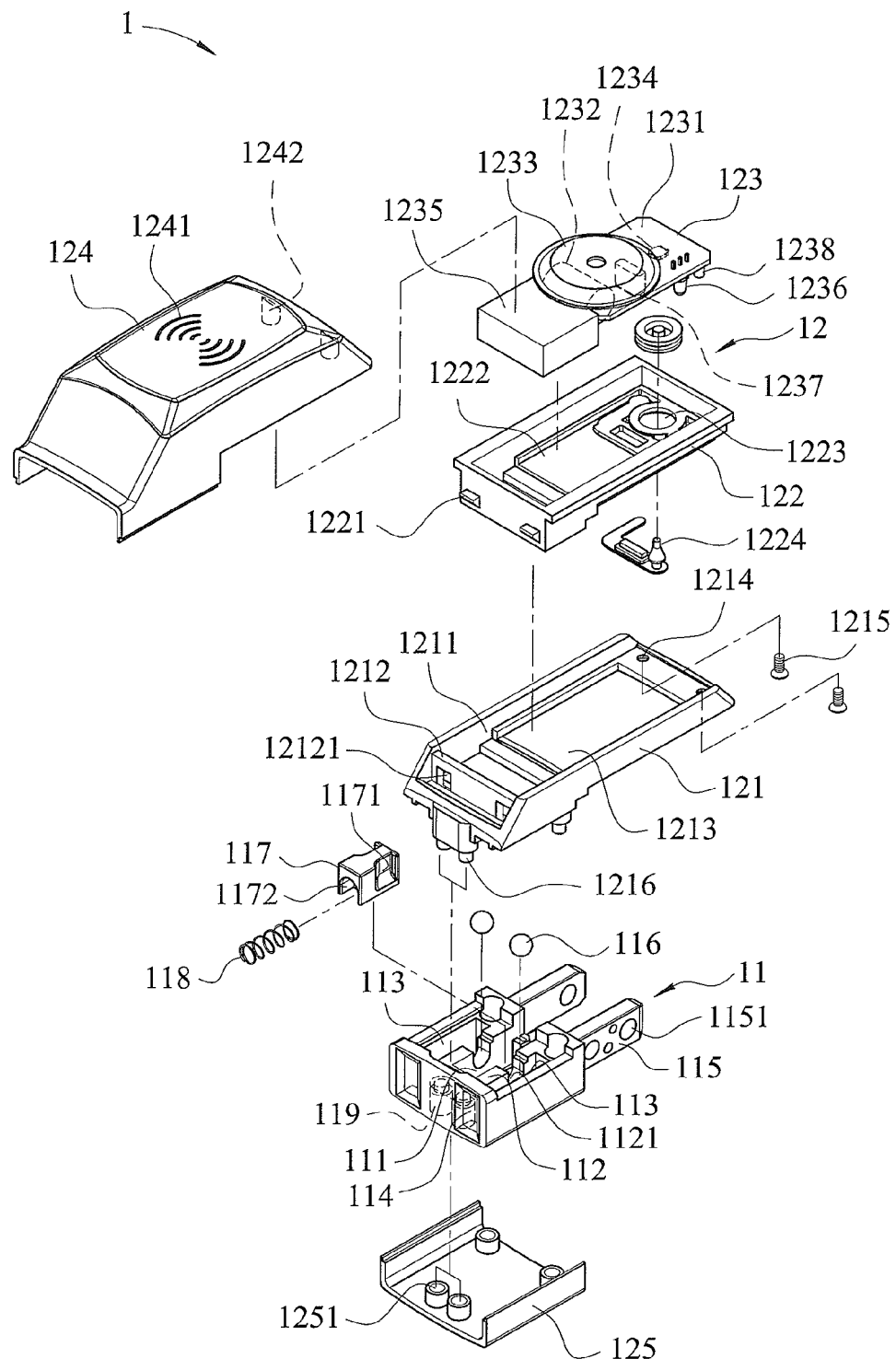
FIG. 2 is an exploded perspective view of the alarm device for a bicycle as shown in FIG. 1.
Figure 3:
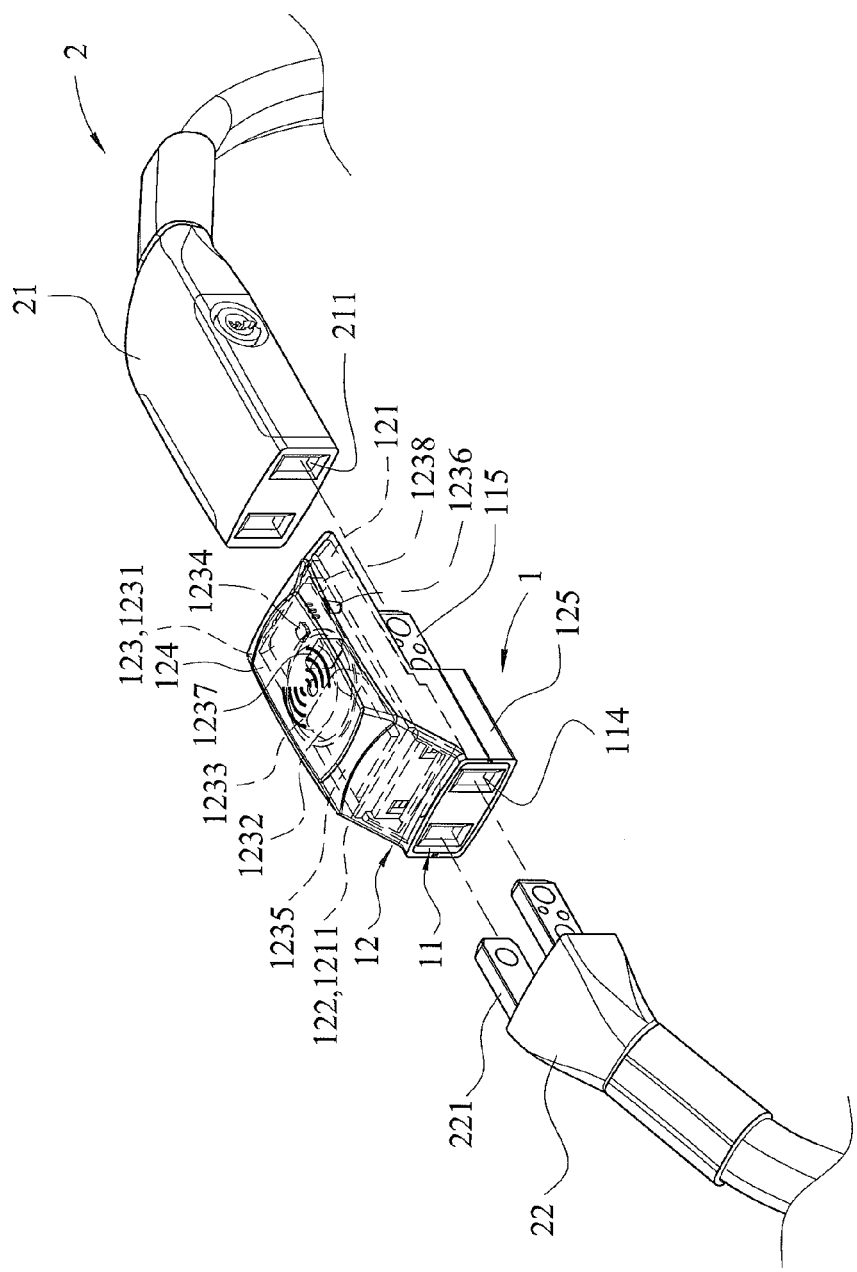
FIG. 3 is an exploded perspective view showing the alarm device as shown in FIG. 1 co-operating with a lock.
Figure 4:
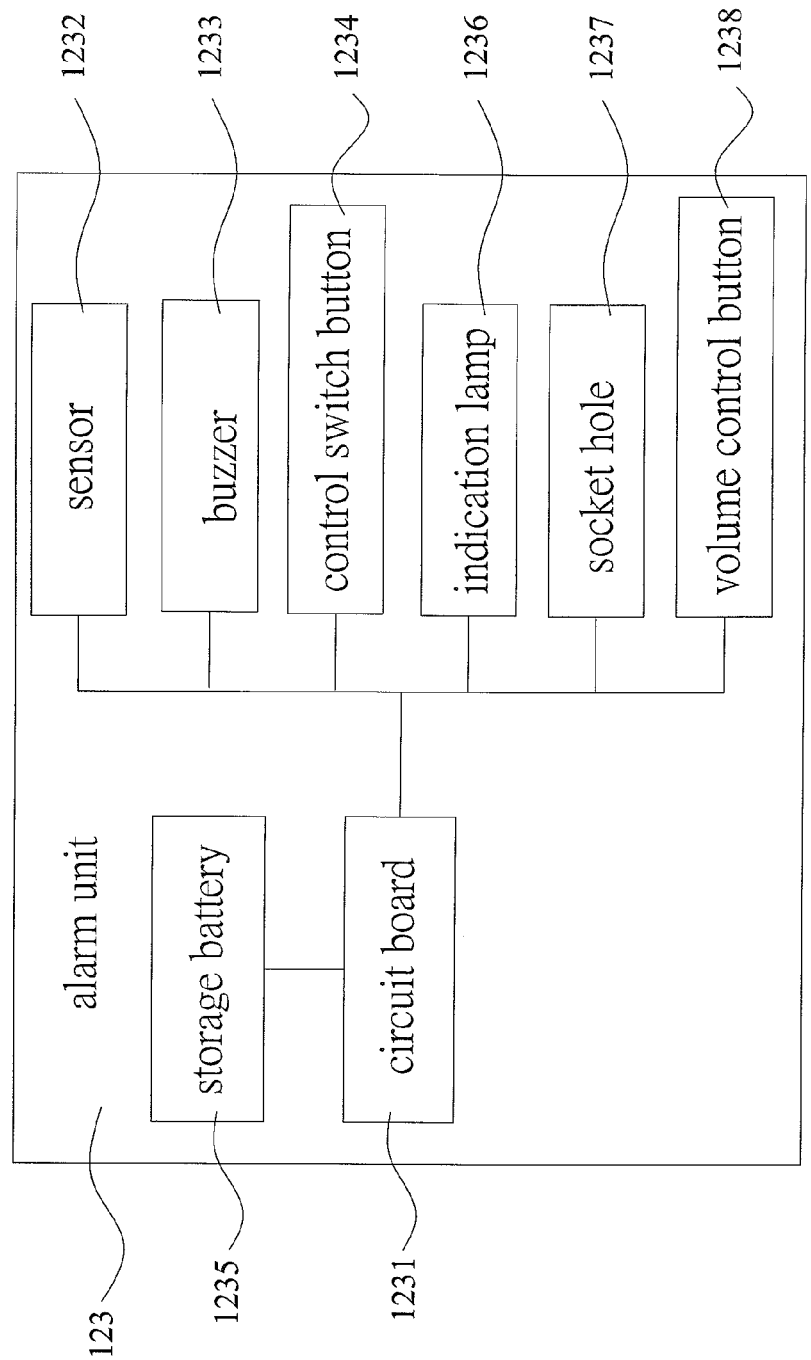
FIG. 4 is a block diagram of an alarm unit of the alarm device for a bicycle as shown in FIG. 1.
Figure 5:
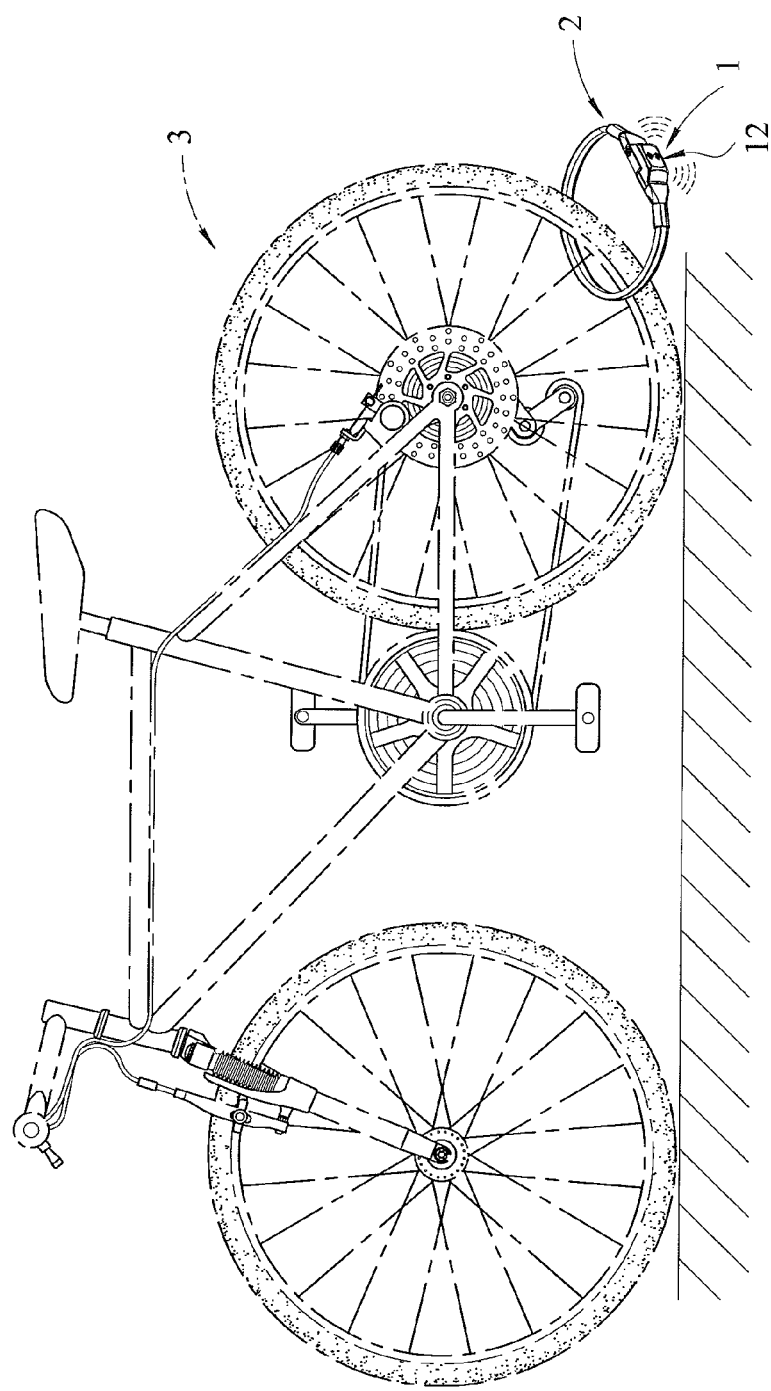
FIG. 5 is a schematic operational view of the alarm device for a bicycle as shown in FIG. 1 in use.

In operation, referring to FIGS. 3-5 with reference to FIGS. 1 and 2, the alarm device 1 is combined with a lock 2 which is used to lock the bicycle 3. The lock 2 has a first end provided with a locking body 21 and a second end provided with a locking seat 22. The locking body 21 of the lock 2 is provided with two slots 211. The locking seat 22 of the lock 2 is provided with two locking blades 221. In use, the control switch button 1234 is pressed to start the alarm unit 123. Then, the locking blades 221 of the locking seat 22 of the lock 2 are inserted into the slots 114 of the locking block 11 of the alarm device 1. Then, the locking blades 115 of the alarm device 1 are inserted into the slots 211 of the locking body 21 of the lock 2. Then, a key is inserted into the locking body 21 of the lock 2 to lock the lock 2. In such a manner, when the sensor 1232 of the alarm unit 123 detects the locking block 11 or the alarm assembly 12 is vibrated or shook due to an external force, the sensor 1232 of the alarm unit 123 transmits a command to the buzzer 1233 of the alarm unit 123 so that the buzzer 1233 of the alarm unit 123 transmits an audible alarm signal as shown in FIG. 5 so as to achieve a burglar-proof effect.

Figure 6:
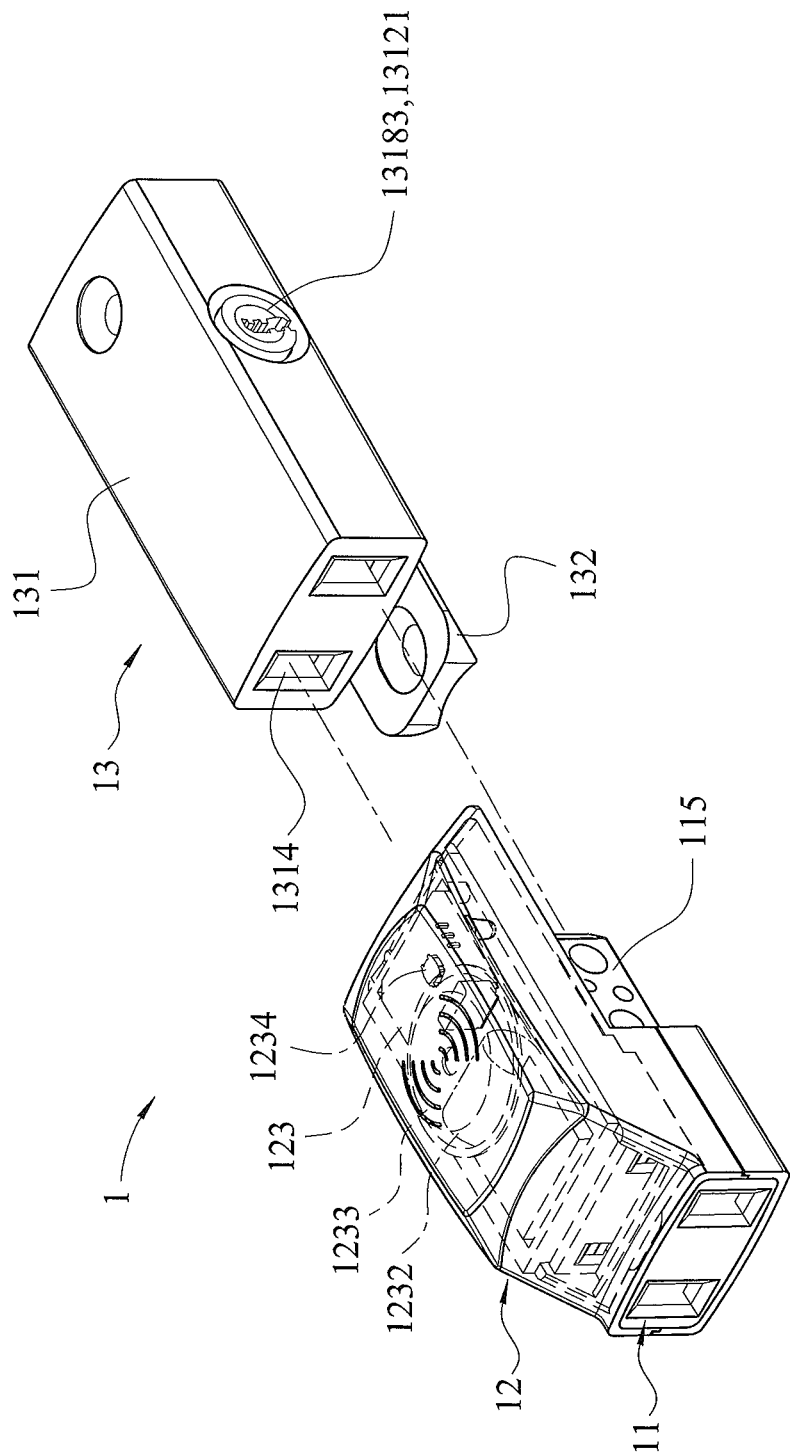
FIG. 6 is a partially exploded perspective view of an alarm device for a bicycle in accordance with another preferred embodiment of the present invention.
Figure 7:
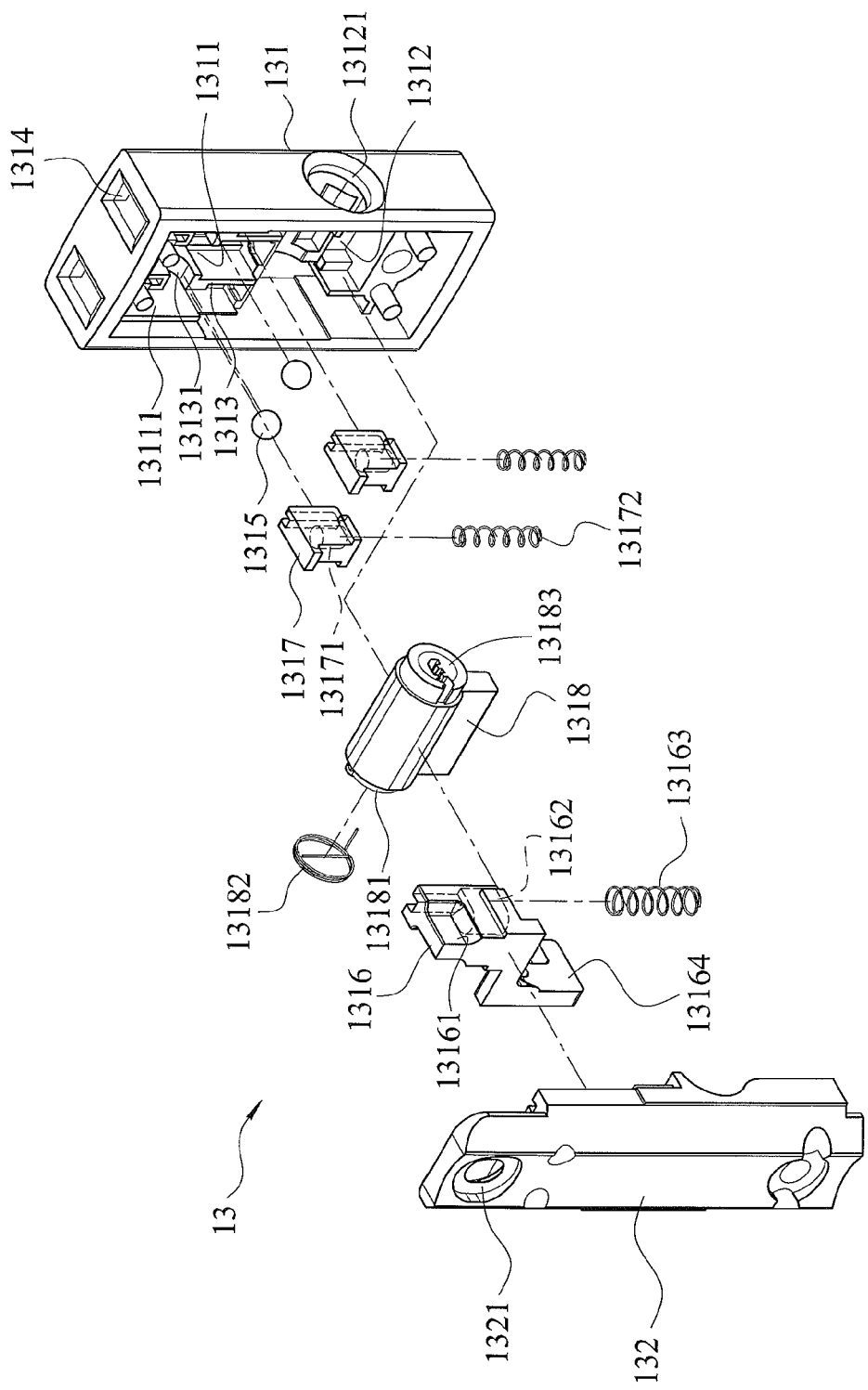
FIG. 7 is an exploded perspective view of a mounting structure of the alarm device for a bicycle as shown in FIG. 6.
Figure 8:
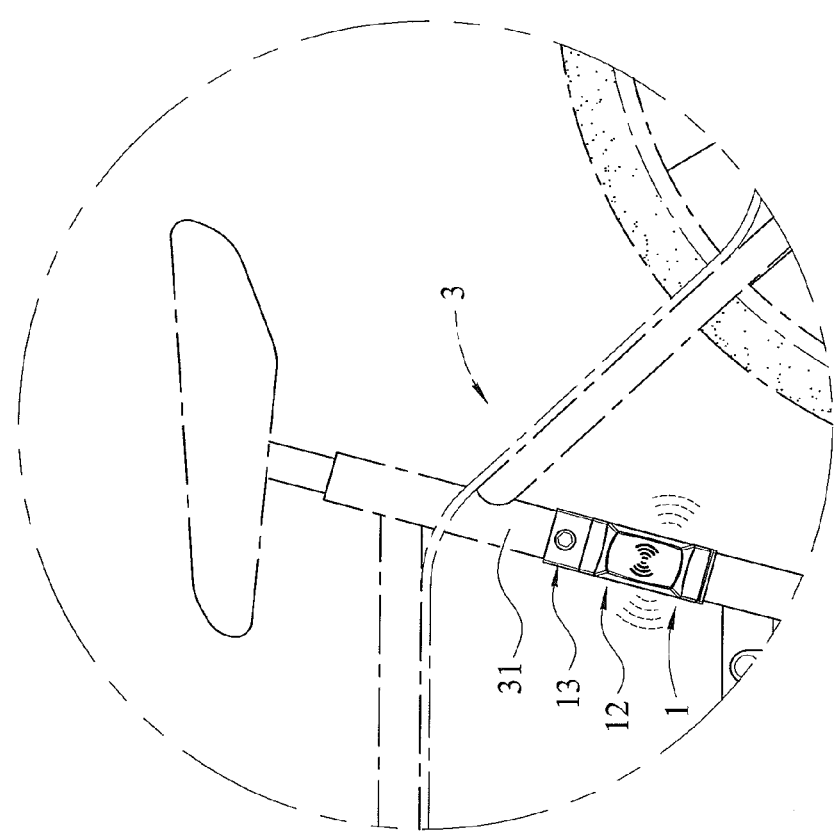
FIG. 8 is a schematic operational view of the alarm device for a bicycle as shown in FIG. 6 in use.

Referring to FIGS. 6-8, the alarm device 1 further comprises a mounting structure 13 combined with the locking block 11. The mounting structure 13 includes a housing 131 having an interior provided with a receiving chamber 1311 and a core chamber 1312 and having an end face provided with two slots 1314, two baffles 1313 mounted in the receiving chamber 1311 of the housing 131 and each provided with a mounting recess 13131, two channels 13111 each defined between the housing 131 and one of the two baffles 1313 and each connected to one of the two slots 1314 of the housing 131, two balls 1315 each movably mounted in the mounting recess 13131 of one of the two baffles 1313, a slide 1316 movably mounted in the receiving chamber 1311 of the housing 131 and having a bottom provided with a receiving recess 13162, a main elastic member 13163 mounted in the receiving recess 13162 of the slide 1316 and pressing the slide 1316 to move the slide 1316, two push pieces 1317 movably mounted in the channels 13111 of the housing 131 and each provided with a receiving hole 13171, two side elastic members 13172 each mounted in the receiving hole 13171 of one of the two push pieces 1317 and pushing the push pieces 1317 to move the push pieces 1317, a lock core 1318 mounted in the core chamber 1312 of the housing 131, and a cover plate 132 combined with the housing 131 to cover the housing 131.

The housing 131 of the mounting structure 13 has a side provided with a through bore 13121 connected to the core chamber 1312. The cover plate 132 is provided with a plurality of fitting holes 1321. The slide 1316 of the mounting structure 13 has two opposite sides each provided with an arcuate limit groove 13161 abutting one of the two balls 1315. The slide 1316 of the mounting structure 13 has an end provided with an extension arm 13164. In the preferred embodiment of the present invention, each of the side elastic members 13172 is a spring or an elastic plate. The lock core 1318 of the mounting structure 13 has a first end provided with a drive piece 13181 abutting the extension arm 13164 of the slide 1316 and a second end provided with a key hole 13183 connected to the through bore 13121 of the housing 131. The mounting structure 13 further includes an elastic element 13182 mounted on the drive piece 13181 of the lock core 1318.

In operation, referring to FIG. 8 with reference to FIGS. 6 and 7, the mounting structure 13 is mounted on a frame 31 of the bicycle 3 by the fitting holes 1321 of the cover plate 132 of the mounting structure 13 co-operating with a plurality of fastening members. Then, the control switch button 1234 is pressed to start the alarm unit 123. Then, the locking blades 115 of the alarm device 1 are inserted into the slots 1314 of the housing 131 of the mounting structure 13. Then, a key is inserted into the key hole 13183 of the lock core 1318 of the mounting structure 13 to lock the mounting structure 13. In such a manner, when the sensor 1232 of the alarm unit 123 detects the locking block 11 or the alarm assembly 12 is vibrated or shook due to an external force, the sensor 1232 of the alarm unit 123 transmits a command to the buzzer 1233 of the alarm unit 123 so that the buzzer 1233 of the alarm unit 123 transmits an audible alarm signal as shown in FIG. 8 so as to achieve a burglar-proof effect.

Accordingly, the alarm device 1 is combined with a lock 2 to lock the bicycle 3 and to achieve a burglar-proof alarm effect. In addition, the alarm device 1 further comprises a mounting structure 13 which is mounted on the frame 31 of the bicycle 3 to achieve a burglar-proof alarm effect. Further, when the sensor 1232 detects the locking block 11 or the alarm assembly 12 is vibrated or shook due to an external force, the sensor 1232 transmits a command to the buzzer 1233 which transmits an audible alarm signal so as to achieve a burglar-proof effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An alarm device for a bicycle, comprising:
a locking block having an interior provided with a receiving chamber and having a first end provided with two slots;
two baffles mounted in the receiving chamber of the locking block and each provided with a mounting recess;
two channels each defined between the locking block and one of the two baffles and each connected to one of the two slots of the locking block;
two balls each movably mounted in the mounting recess of one of the two baffles;
two locking blades mounted on a second end of the locking block;
a slide movably mounted in the receiving chamber of the locking block and having a bottom provided with a receiving recess;
an elastic member mounted in the receiving recess of the slide and pressing the slide; and
an alarm assembly connected with the locking block;
wherein:
the alarm assembly includes:
a base mounted on a top of the locking block;
a mounting seat mounted on the base;
an alarm unit mounted on the mounting seat;
a top cover mounted on the alarm unit; and
a bottom cover mounted on a bottom of the locking block and juxtaposed to the top cover;
the base of the alarm assembly has a top provided with a receiving depression which has a surface provided with a hollow portion;
the mounting seat of the alarm assembly is mounted in the receiving depression of the base; and
when the alarm unit of the alarm assembly is started, the alarm unit of the alarm assembly detects vibration or shaking of the locking block or the alarm assembly due to an external force and transmits an alarm signal.

2. The alarm device for a bicycle of claim 1, wherein:
the base of the alarm assembly has a first end provided with a positioning plate and a second end provided with at least one through hole;
the positioning plate of the base is provided with at least one positioning hole;
the mounting seat of the alarm assembly has an end face provided with at least one positioning knobs inserted into and positioned in the positioning hole of the positioning plate;
the top cover of the alarm assembly has a bottom provided with at least one screw bore aligning with the through hole of the base; and
the alarm assembly further includes at least one threaded fastening member extended through the through hole of the base and screwed into the screw bore of the top cover.

3. The alarm device for a bicycle of claim 2, wherein:
the mounting seat of the alarm assembly is provided with a mounting chamber for mounting the alarm unit;
the mounting chamber of the mounting seat is provided with an exposing hole; and
the alarm unit of the alarm assembly is mounted in the mounting chamber of the mounting seat.

4. The alarm device for a bicycle of claim 3, wherein:
the alarm unit of the alarm assembly includes:
a circuit board;
at least one sensor mounted on and electrically connected with the circuit board;
at least one buzzer electrically coupled to the sensor;
a control switch button mounted on the circuit board and corresponding to the exposing hole of the mounting seat;
at least one storage battery electrically connected with the circuit board;
an indication lamp mounted on the circuit board and corresponding to the exposing hole of the mounting seat; and
at least one socket hole mounted on the circuit board and corresponding to the exposing hole of the mounting seat;
the sensor of the alarm unit detects if the locking block or the alarm assembly is vibrated or shook due to an external force;
the buzzer of the alarm unit receives a command transmitted from the sensor and transmits an audible alarm signal;

the control switch button of the alarm unit turns on or off the alarm unit;

the storage battery of the alarm unit supplies an electric power required by the alarm unit; and the indication lamp of the alarm unit indicates the quantity of electricity of the storage battery.

5. The alarm device for a bicycle of claim 4, wherein:

the alarm unit of the alarm assembly further includes a volume control button mounted on the circuit board; and the volume control button of the alarm unit regulates the volume of the audible alarm signal transmitted from the buzzer.

6. The alarm device for a bicycle of claim 1, wherein:

the locking block is provided with a plurality of mounting holes;

the slide has two opposite sides each provided with an arcuate limit groove abutting one of the two balls;

the base of the alarm assembly has a bottom provided with a plurality of fixing pins inserted into the mounting holes of the locking block;

the top cover of the alarm assembly covers the alarm unit, the mounting seat, the base and the top of the locking block;

the top cover of the alarm assembly has a surface provided with a plurality of buzzing holes; and the bottom cover of the alarm assembly is provided with a plurality of fixing holes mounted in the mounting holes of the locking block and combined with the fixing pins of the base.

7. The alarm device for a bicycle of claim 1, wherein:

the alarm device further comprises a mounting structure combined with the locking block;

the mounting structure includes:

a housing having an interior provided with a receiving chamber and a core chamber and having an end face provided with two slots;

two baffles mounted in the receiving chamber of the housing and each provided with a mounting recess;

two channels each defined between the housing and one of the two baffles and each connected to one of the two slots of the housing;

two balls each movably mounted in the mounting recess of one of the two baffles;

a slide movably mounted in the receiving chamber of the housing and having a bottom provided with a receiving recess;

a main elastic member mounted in the receiving recess of the slide and pressing the slide;

two push pieces movably mounted in the channels of the housing and each provided with a receiving hole;

two side elastic members each mounted in the receiving hole of one of the two push pieces and pushing the push pieces;

a lock core mounted in the core chamber of the housing; and a cover plate combined with the housing to cover the housing.

8. The alarm device for a bicycle of claim 7, wherein:

the housing of the mounting structure has a side provided with a through bore connected to the core chamber;

the slide of the mounting structure has two opposite sides each provided with an arcuate limit groove abutting one of the two balls;

the slide of the mounting structure has an end provided with an extension arm;

the lock core of the mounting structure has a first end provided with a drive piece abutting the extension arm of the slide and a second end provided with a key hole connected to the through bore of the housing; and the mounting structure further includes an elastic element mounted on the drive piece of the lock core.

* * * * *